United States Patent
Guen et al.

(10) Patent No.: US 9,722,237 B2
(45) Date of Patent: Aug. 1, 2017

(54) SECONDARY BATTERY

(71) Applicant: SAMSUNG SDI CO., LTD., Yongin-si, Gyeonggi-do (KR)

(72) Inventors: Min-Hyung Guen, Yongin-si (KR); Yong-Chul Seo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/603,257

(22) Filed: Jan. 22, 2015

(65) Prior Publication Data

US 2015/0270529 A1 Sep. 24, 2015

(30) Foreign Application Priority Data

Mar. 20, 2014 (KR) .......................... 10-2014-0032738

(51) Int. Cl.
*H01M 2/34* (2006.01)
*H01M 2/26* (2006.01)

(52) U.S. Cl.
CPC ........... *H01M 2/348* (2013.01); *H01M 2/263* (2013.01); *H01M 2200/103* (2013.01)

(58) Field of Classification Search
None
See application file for complete search history.

(56) References Cited

U.S. PATENT DOCUMENTS

| 2003/0077484 A1 | 4/2003 | Cho | |
|---|---|---|---|
| 2005/0083166 A1* | 4/2005 | Senda | ..................... C22C 28/00 337/159 |
| 2005/0181242 A1 | 8/2005 | Suzuki et al. | |
| 2011/0081560 A1 | 4/2011 | Kim et al. | |
| 2011/0177365 A1* | 7/2011 | Yasui | .................... H01M 2/105 429/61 |
| 2011/0177387 A1* | 7/2011 | Byun | ...................... H01M 2/04 429/178 |
| 2011/0183193 A1* | 7/2011 | Byun | .................. H01M 2/0426 429/178 |

(Continued)

FOREIGN PATENT DOCUMENTS

| EP | 2 306 485 A1 | 4/2011 |
|---|---|---|
| EP | 2 348 558 A1 | 7/2011 |

(Continued)

OTHER PUBLICATIONS

EPO Search Report dated Jun. 25, 2015, for corresponding European Patent application 15159836.4, (6 pages).

(Continued)

*Primary Examiner* — Patrick Ryan
*Assistant Examiner* — Haixia Zhang
(74) *Attorney, Agent, or Firm* — Lewis Roca Rothgerber Christie LLP

(57) ABSTRACT

A secondary battery having improved safety includes an electrode assembly, a case, and a cap assembly. The electrode assembly has first and second non-coating portions. The case accommodates the electrode assembly. The cap assembly includes a cap plate coupled to the case, and first and second collector plates. In the secondary battery, the first and second non-coating portions and the first and second collector plates are connected or coupled by first and second lead tabs, respectively, and the first and/or second lead tabs include a fuse portion.

8 Claims, 3 Drawing Sheets

(56) References Cited

U.S. PATENT DOCUMENTS

| | | | | |
|---|---|---|---|---|
| 2011/0183197 A1* | 7/2011 | Byun | ............... | H01M 2/04 |
| | | | | 429/185 |
| 2011/0305928 A1* | 12/2011 | Kim | ............ | H01M 10/0431 |
| | | | | 429/61 |
| 2012/0121965 A1 | 5/2012 | Makino et al. | | |
| 2012/0148884 A1* | 6/2012 | Kim | ............... | H01M 2/06 |
| | | | | 429/61 |
| 2013/0004831 A1* | 1/2013 | Byun | ............... | H01M 2/26 |
| | | | | 429/179 |
| 2013/0143080 A1 | 6/2013 | Byun | | |
| 2013/0202941 A1* | 8/2013 | Ono | ............... | H01H 69/02 |
| | | | | 429/121 |
| 2014/0079966 A1 | 3/2014 | Byun et al. | | |

FOREIGN PATENT DOCUMENTS

| | | |
|---|---|---|
| EP | 2 541 649 A1 | 1/2013 |
| KR | 2003-0032562 | 4/2003 |
| KR | 10-2011-0021433 | 3/2011 |

OTHER PUBLICATIONS

EPO Examination Report dated Jun. 23, 2016 issued in corresponding EP Application No. 15 159 836.4, 6 pages.
EPO Office Action dated Nov. 15, 2016, for corresponding European Patent Application No. 15159836.4 (4 pages).

* cited by examiner

SECONDARY BATTERY

CROSS-REFERENCE TO RELATED APPLICATION

This application claims priority to and the benefit of Korean Patent Application No. 10-2014-0032738, filed on Mar. 20, 2014, in the Korean Intellectual Property Office, the entire contents of which are incorporated herein by reference.

BACKGROUND

1. Field

Aspects of the present invention relate to a secondary battery having improved safety features.

2. Description of the Related Art

As electronics and communications industries rapidly develop, the use of portable electronic devices such as camcorders, cellular phones, and notebook computers has increased. Accordingly, usage of secondary batteries has also been increased. These secondary batteries are used not only for portable electronic devices, but also for medium and larger-sized apparatuses such as an electric and electronic tools, automobiles, space transportation means and devices, motorbikes, motor scooters, and aerial transportation means and devices, which require high output and high power.

A high-power secondary battery using a non-aqueous electrolyte with high energy density has been developed. These high-power secondary batteries are typically large-capacity secondary batteries manufactured by connecting a plurality of secondary batteries in series for use in driving motors of devices requiring high power, e.g., electric vehicles, etc.

A large-capacity secondary battery generally includes a plurality of secondary batteries connected in series, and the shapes of each secondary battery may be cylindrical, square, and the like.

When a short circuit occurs inside a secondary battery or when a short circuit occurs due to an external foreign substance, overcurrent flows in the secondary battery. If the overcurrent continuously flows, excessive heat may be generated inside the secondary battery, possibly causing the secondary battery to explode or catch fire.

SUMMARY

Aspects of the present invention are directed toward a secondary battery having a structure capable of improving safety of the secondary battery during overcurrent flow. Accordingly, a secondary battery according to embodiments of the present invention, may reduce or prevent an arc caused by a short circuit that may often result in an explosion or fire of the secondary battery, thereby improving the safety of the secondary battery.

Additional aspects of the present invention are directed toward a secondary battery having a connection terminal with first and second protruding portions that enables a first or second collector plate, a cap plate, and an insulating plate to be closely coupled or connected to one another.

Additional aspects of the present invention are directed toward a secondary battery having first and second lead tabs having a thickness less than that of first and second collector plates.

According to aspects of the present invention, a secondary battery includes an electrode assembly having first and second non-coating portions, a case accommodating the electrode assembly, and a cap assembly having a cap plate coupled to the case and first and second collector plates. The first and second non-coating portions and the first and second collector plates may be coupled by first and second lead tabs, respectively. The first and/or second lead tab may include a fuse portion.

The fuse portion may be defined as an opening through a surface of the first and/or second lead tabs.

The first lead tab may be a negative electrode and the second lead tab may be a positive electrode.

The fuse portion may be defined in the second lead tab.

The secondary battery may further include insulating plates between each of the first and second collector plates and the cap plate.

The secondary battery may further include a connection terminal between each of the first and second collector plates and respective insulating plates, and may further include a first protruding portion at an upper surface and a second protruding portion at a lower surface of each connection terminal.

The secondary battery may further include a first terminal hole defined in the first and/or second collector plate, a second terminal hole defined in at least each insulating plate corresponding to the collector plate defining the first terminal hole, and at least one third terminal hole defined in the cap plate. The first, second, and at least one third terminal holes may be positioned in vertical alignment to be coupled by the respective connection terminal. The first protruding portion may be accommodated in the first terminal hole, and the second protruding portion may be accommodated in the second and at least one third terminal holes.

The first and second lead tabs may have a thickness less than that of the respective first and second collector plates.

The first and/or second lead tabs may each have a thickness less than or equal to 0.3 millimeters (mm).

The first and/or second collector plates may each have a thickness of at least 0.5 millimeters (mm).

As described above, the secondary battery according to embodiments of the present invention, includes a separate lead tab at the terminal portion and defining a fuse portion configure to increase durability of the fuse portion and reducing or preventing an arc caused by a short circuit, thereby improving the safety of the secondary battery.

Further, according to additional embodiments of the present invention, the first and second protruding portions are on the upper and lower surfaces, respectively, of the connection terminal to closely fasten or seal the members, so that current can stably flow, thereby helping improve the durability of the secondary battery.

Further, according to additional embodiments of the present invention, the thickness of the lead tab is less than that of the collector plate, such that the lead tab can have flexibility, thereby facilitating in the assembly of the secondary battery and helping improve the working efficiency of the secondary battery.

BRIEF DESCRIPTION OF THE DRAWINGS

Example embodiments will now be described more fully hereinafter with reference to the accompanying drawings; however, these example embodiments may be embodied in different forms and should not be construed as limited to the embodiments set forth herein. Rather, these embodiments are provided for thoroughness and completeness of this disclosure, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
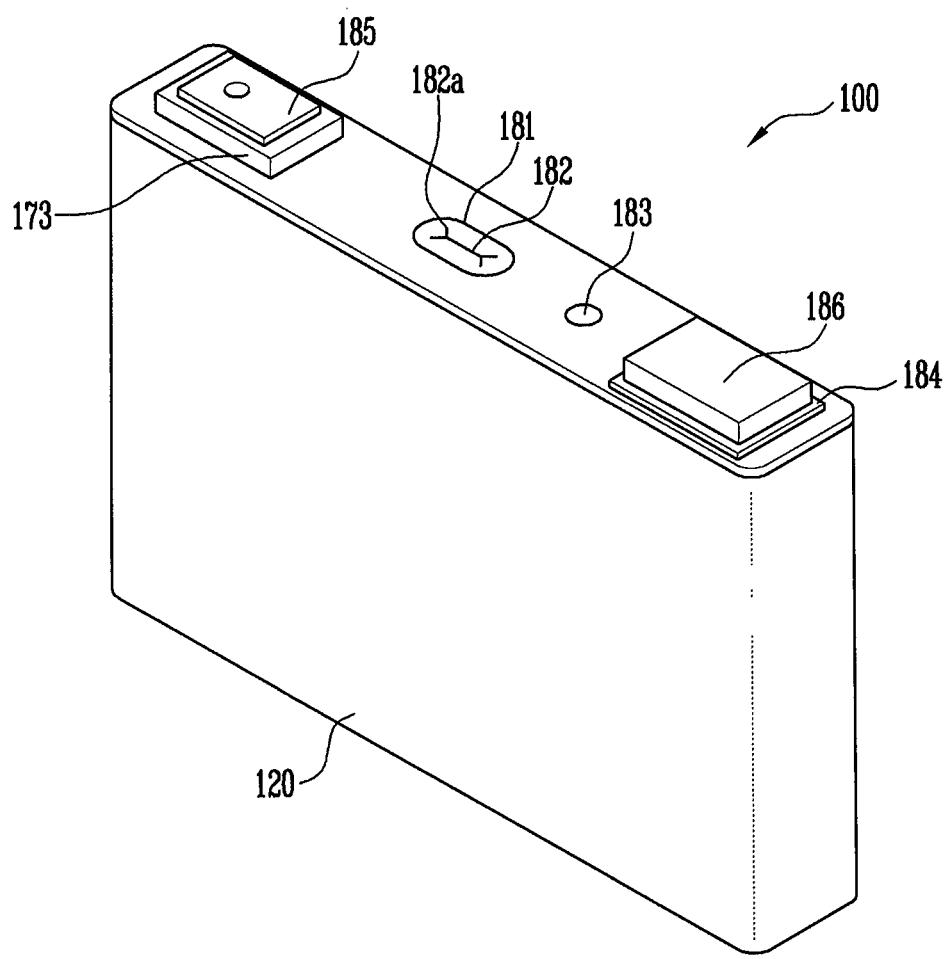
FIG. 1 is a perspective view showing a secondary battery according to an embodiment of the present invention.

In the following detailed description, only certain embodiments of the present invention are shown and described, simply by way of illustration. As those skilled in the art would recognize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Figure 2:
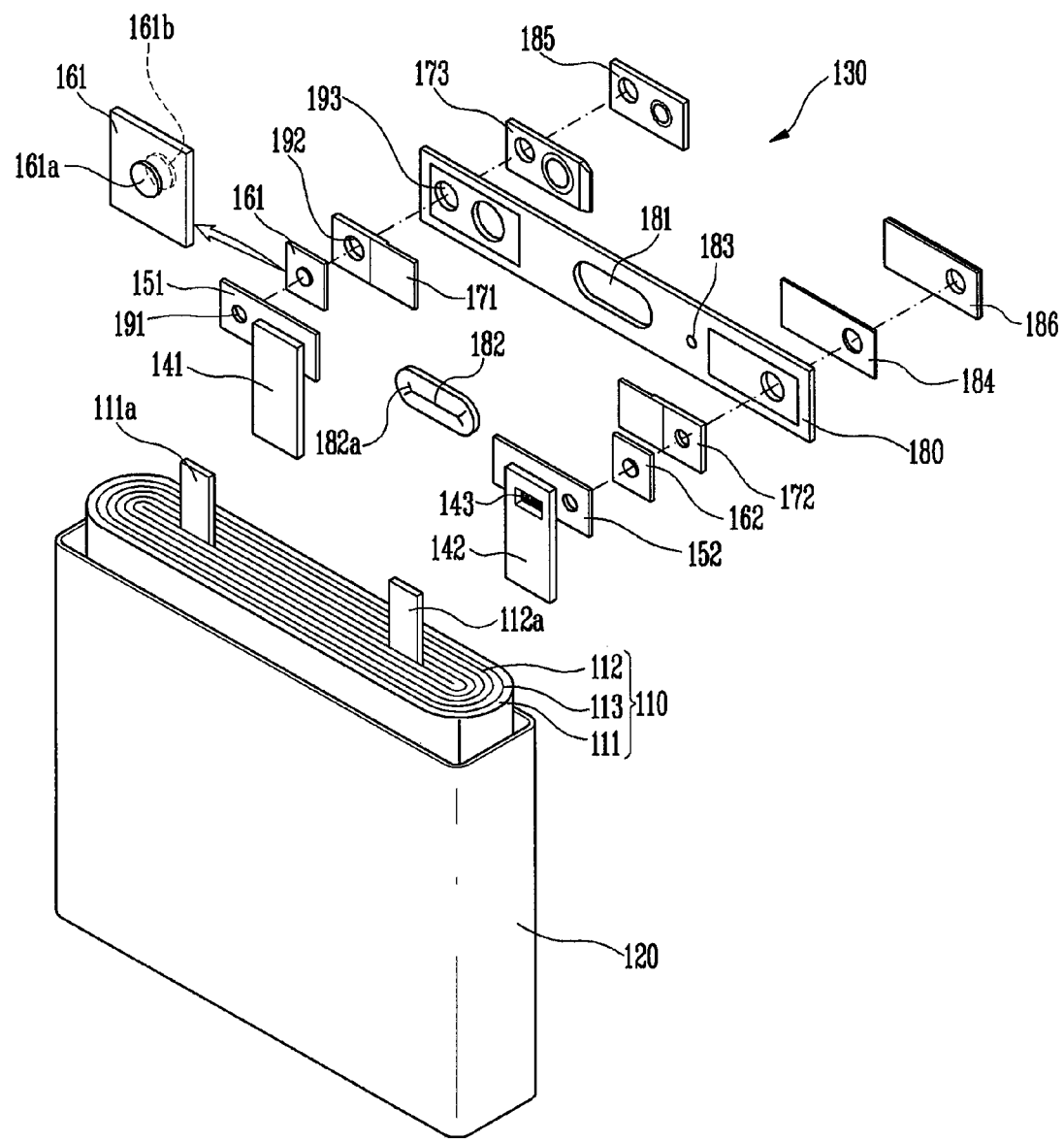
FIG. 2 is an exploded perspective view of a cap assembly of the secondary battery according to the embodiment of the present invention shown in FIG. 1.

FIG. 1 is a perspective view showing a secondary battery 100 according to an embodiment of the present invention. FIG. 2 is an exploded perspective view of a cap assembly of the secondary battery 100 according to the embodiment of the present invention shown in FIG. 1.

As shown in the embodiment illustrated in FIGS. 1 and 2, the secondary battery 100 according to this embodiment includes an electrode assembly 110 including first and second non-coating portions 111a and 112a, a case 120 configured to accommodate the electrode assembly 110 and having one open surface, and a cap assembly 130 including a cap plate 180 configured to seal the opening and the first and second collector plates 151 and 152 and electrode assembly 110 within the case 120. The first and second non-coating portions 111a and 112a and the first and second collector plates 151 and 152, in an embodiment, are connected or coupled by first and second lead tabs 141 and 142, respectively, and either one of the first and/or second lead tabs 141 and 142 may include a fuse portion 143.

The electrode assembly 110 may be manufactured in a jelly roll assembly by winding first and second electrode plates 111 and 112 and a separator 113, which may be laminated to each other. Alternatively, the electrode assembly 110 may be manufactured in a stack assembly by stacking a plurality of first and second electrode plates 111 and 112 and a plurality of separators 113. Alternately, the electrode assembly 110 may be manufactured using both the winding and stacking processes.

The first electrode plate 111, according to an embodiment, includes a first active material coating portion formed by intermittently coating a first active material on a first base material such as a sheet-shaped conductive material, and the first non-coating portion 111a that is a portion at which the first active material is not coated allowing the first base material to be exposed. The first non-coating portion 111a may protrude or extend from one side of the first electrode plate 111. In an embodiment, the first electrode plate 111 may be a negative electrode plate, and the first active material may be a negative electrode active material including a carbon material such as crystalline carbon, amorphous carbon, carbon composite or carbon fiber, lithium metal, or lithium alloy.

The second electrode plate 112, in an embodiment, has a different polarity from the first electrode plate 111. The second electrode plate 112, in an embodiment, includes a second active material coating portion formed by intermittently coating a second active material on a second base material such as a sheet-shaped conductive material, and the second non-coating portion 112a that is a portion at which the second active material is not coated allowing the second base material to be exposed. The second non-coating portion 112a may protrude or extend from one side of the second electrode plate 112. In an embodiment, the second electrode plate 112 may be a positive electrode plate, and the second active material may be a positive electrode active material including lithium such as $LiCoO_2$, $LiNiO_2$, $LiMnO_2$, $LiMn_2O_4$, or $LiNi_{1-x-y}Co_xM_yO_2$.

The separator, in an embodiment, 113 is positioned between the first and second electrode plates 111 and 112 prior to being wound, and insulates the first and second electrode plates 111 and 112 from each other. The separator 113, in an embodiment, enables lithium ions to be exchanged between the first and second electrode plates 111 and 112. The separator 113, according to an embodiment, has sufficient length and surface area to completely insulate between the first and second electrode plates 111 and 112 even if the electrode assembly 110 is contracted and expanded.

The first and/or second base material, in an embodiment, acts as a collector of current or electrons, and may include a thin-film shaped metal. In an embodiment, the first base material may include copper, and the second base material may include aluminum. The first and second electrode plates 111 and 112, in this embodiment, discharge ions into an electrolyte to generate a flow of current or electrons, and the current or electrons is/are transferred to an exterior of the electrode assembly through the first and second non-coating portions 111a and 112a . The first non-coating portion 111a may be a negative electrode, and the second non-coating portion 112a may be a positive electrode.

The case 120 may be formed in the shape of a rectangular parallelepiped having one open end to accommodate the electrode assembly 110 and the electrolyte therein. The opening may be sealed by the cap assembly 130. Although it has been illustrated in FIG. 1 that the case 120 is a rectangular parallelepiped, the present invention is not limited thereto, and the case 120 may be manufactured as a cylindrical case, a pouch-type case, a coin-type case, etc.

In an embodiment, the cap assembly 130 may include the cap plate 180 configured to seal the opening, the first and second lead tabs 141 and 142 positioned below the cap plate 180 and connected or coupled to the first and second non-coating portions 111a and 112a, respectively, and the first and second collector plates 151 and 152 connected or coupled to the first and second lead tabs 141 and 142, respectively.

The cap plate 180, in an embodiment, has a size and shape corresponding to the opening of the case 120, and may be formed from the same material as the case 120. The cap plate 180, in an embodiment, is electrically connected or coupled to the case 120, having the same electrode polarity as the case 120. The cap plate 180 may further include a vent hole 181, a vent plate 182 having a notch 182a defined in the vent plate 182 such that the vent plate 182 can be opened at a predetermined pressure, and an electrolyte injection hole 183 through which the electrolyte may be injected into the case 120.

The first collector plate 151, according to an embodiment, is formed from a material such as copper, copper alloy, nickel, or nickel alloy, and is connected or coupled to the first lead tab 141. The second collector plate 152, according to an embodiment, is formed from a material such as aluminum or aluminum alloy, and is connected or coupled the second lead tab 142. Thus, in these embodiments, the first and second collector plates 151 and 152 can be connected or coupled to the cap plate 180. In an embodiment, lower insulating plates 171 and 172 for supporting the first and second collector plates 151 and 152 may be between the first and second collector plates 151 and 152, respectively, and the cap plate 180. In addition, an upper insulating plate 173 and a top plate 184 may be provided over the cap plate 180. The upper insulating plate 173 may be provided to ensure insulation between the cap plate 180 and the first terminal portion 185. The top plate 184 may be provided to closely fasten the cap plate 180 and the second terminal portion 186 to each other.

The first and second lead tabs 141 and 142, according to an embodiment, may be formed in a plate shape to be electrically connected or coupled to the first and second non-coating portions 111a and 112a, respectively, and the fuse portion 143 may be formed in the shape of a through-hole defined at either one of the first and/or second lead tabs 141 and 142. Accordingly, as a fuse of the fuse portion 143 is melted in overcharging, in an embodiment, the fuse portion 143 is configured to cut off the electrical connection or coupling between the first non-coating portion 111a and the first collector plate 151, or between the second non-coating portion 112a and the second collector plate 152.

In an embodiment, first, second, and third terminal holes 191, 192, and 193 may be defined in the first or second collector plate 151 or 152, the lower insulating plate 171 or 172, and the cap plate 180, respectively. The first, second, and third terminal holes 191, 192 and 193 may be aligned in the vertical direction, and may be connected or coupled by a connection terminal 161 or 162.

The connection terminals 161 and 162, according to an embodiment, may be positioned between the collector plates 151 and 152 and the lower insulating plates 171 and 172, respectively. First and second protruding portions 161a and 161b may be at upper and lower surfaces of the connection terminal 161 or 162, respectively. In an embodiment, the first protruding portion 161a may be connected or coupled to the collector plate 151 or 152 by being inserted into the first terminal hole 191, and the second protruding portion 161b may be connected to the insulating plate 171 or 172 and the cap plate 180 by being inserted into the second and third terminal holes 192 and 193, respectively. A gasket may be at each of the first, second, and third terminal holes 191, 192, and 193 such that the first and second protruding portions 161a and 161b can be closely fastened or sealed to the first, second, and third terminal holes 191, 192, and 193. In addition, in an embodiment, first and second terminal portions 185 and 186 may be electrically connected or coupled to the first and second non-coating portions 111a and 112a, respectively, by the connection terminals 161 and 162, respectively. In an embodiment, the first terminal portion 185 is connected or coupled to the first non-coating portion 111a, and the second terminal portion 186 is connected or coupled to the second non-coating portion 112a. Therefore, in this embodiment, the first terminal portion 185 may be a negative electrode, and the second terminal portion 186 may be a positive electrode.

Figure 3:
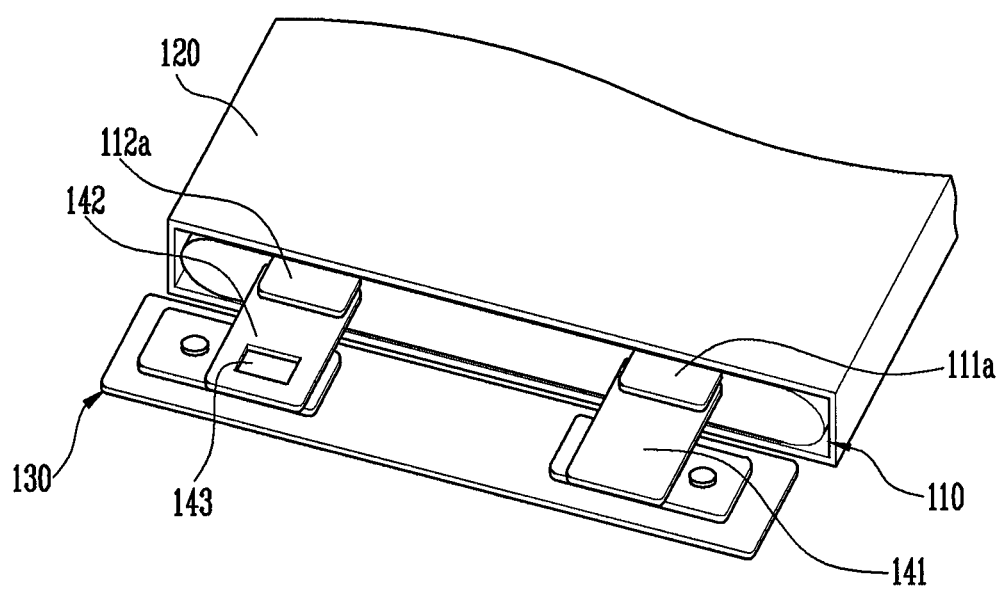
FIG. 3 is a perspective view showing a detailed cap assembly according to an embodiment of the present invention.

FIG. 3 is a perspective view showing a detailed cap assembly 130 according to an embodiment of the present invention.

As shown in the embodiment in FIG. 3, one side on a surface of each of the first and second lead tabs 141 and 142 may be connected or coupled to the first and second non-coating portions 111a and 112a, respectively, and the other or opposite side on the surface of each of the first and second lead tabs 141 and 142 may be connected to the first and second collector plates 151 and 152, respectively (as shown in FIG. 2). In this embodiment, the fuse portion 143 defined a through-hole may be defined in one area or side of the second lead tab 142 (or alternatively, in one area or side of the first lead tab 141).

The secondary battery 100, according to this embodiment, generates high current, and therefore, the first and second lead tabs 141 and 142 and the first and second collector plates 151 and 152 may have a rigid structure to provide a set or predetermined strength, such that the high current generated can stably flow. In this embodiment, the first and second lead tabs 141 and 142 have a set or predetermined strength but may have a smaller thickness than that of the first and second collector plates 151 and 152 in order to have increased flexibility. In an embodiment, the first and second lead tabs 141 and 142 may have a thickness of less than or equal to 0.3 millimeters (mm) to be able to be easily bendable, and the first and second collector plates 151 and 152 may have a thickness of greater than or equal to 0.5 mm to be able to endure a greater load with respect to the weight of the electrode assembly 110. Thus, the first and second lead tabs 141 and 142 having greater flexibility, according to this embodiment, enable the cap plate 180 of the cap assembly 130 to be more easily coupled to the case 120.

As described above, the first and second lead tabs 141 and 142 can have a set or predetermined strength and have a thickness of less than or equal to 0.3 mm in order to be more flexible or bendable, according to an embodiment. According to this embodiment, the first and second lead tabs 141 and 142 are configured to be bent by an external force to be inserted into the case 120, and the cap plate 180 is configured to seal the opening of the case 120. In addition, the fuse portion 143 according to this embodiment is defined in one area or side of the second lead tab 142 (or alternatively, the first lead tab 141), in order to avoid or minimize interference of a peripheral member. Thus, the fuse portion 143, in this embodiment, may increase durability of the secondary battery 100 and may help reduce or prevent an arc caused by a short circuit.

Example embodiments have been disclosed herein, and although specific terms are employed, they are used and are to be interpreted in a generic and descriptive sense only and not for purpose of limitation. In some instances, as would be apparent to one of ordinary skill in the art, features, characteristics, and/or elements described in connection with a particular embodiment may be used singly or in combination with features, characteristics, and/or elements described in connection with other embodiments, unless otherwise specifically indicated. Accordingly, it will be understood by those of skill in the art that various changes in form and details may be made without departing from the spirit and scope of the present invention, and as set forth in the following claims.

What is claimed is:

1. A secondary battery, comprising:
an electrode assembly comprising first and second non-coating portions;
a case accommodating the electrode assembly; and
a cap assembly comprising:
 a cap plate coupled to the case;
 a first lead tab and a second lead tab directly coupled to the first and second non-coating portion, respectively;
 a first collector plate and a second collector plate directly coupled to the first and second lead tab, respectively, and
an insulating plate between the second collector plate and the cap plate wherein the second lead tab defines a fuse portion including an opening extending entirely through the second lead tab, wherein the fuse portion directly exposes a surface of the second collector plate through the entire fuse portion and wherein the fuse portion is entirely spaced from the insulating plate.

2. The secondary battery of claim 1, wherein the first lead tab comprises a negative electrode and the second lead tab comprises a positive electrode.

3. The secondary battery of claim 1, further comprising an insulating plate between the first collector plate and the cap plate.

4. The secondary battery of claim 3, further comprising:
a connection terminal between each of the first collector plate and the second collector plate and respective insulating plates, and
a first protruding portion at an upper surface and a second protruding portion at a lower surface of each connection terminal.

5. The secondary battery of claim 4, further comprising a first terminal hole defined in the first collector plate or the second collector plate, a second terminal hole defined in at least each insulating plate corresponding to the collector plate defining the first terminal hole, and at least one third terminal hole defined in the cap plate,
wherein the first, second, and at least one third terminal holes are positioned in vertical alignment to be coupled by the respective connection terminal, and
wherein the first protruding portion is accommodated in the first terminal hole, and the second protruding portion accommodated in the second and at least one third terminal holes.

6. The secondary battery of claim 1, wherein the first lead tab and the second lead tab have a thickness less than that of the respective first collector plate and the second collector plate.

7. The secondary battery of claim 6, wherein the first lead tab and/or second lead tab each has a thickness less than or equal to 0.3 millimeters (mm).

8. The secondary battery of claim 6, wherein the first collector plate or the second collector plate has a thickness of at least 0.5 millimeters (mm).

* * * * *